US010511727B2

(12) United States Patent
Ogata et al.

(10) Patent No.: US 10,511,727 B2
(45) Date of Patent: Dec. 17, 2019

(54) COMMUNICATION DEVICE, COMMUNICATION SYSTEM AND COMMUNICATION METHOD

(71) Applicant: Olympus Corporation, Hachioji-shi, Tokyo (JP)

(72) Inventors: Yoshihisa Ogata, Hachioji (JP); Keito Fukushima, Mitaka (JP); Kazuo Kanda, Higashiyamato (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/652,250

(22) Filed: Jul. 18, 2017

(65) Prior Publication Data
US 2017/0318165 A1    Nov. 2, 2017

Related U.S. Application Data

(63) Continuation of application No. PCT/JP2016/057957, filed on Mar. 14, 2016.

(30) Foreign Application Priority Data

Mar. 16, 2015 (JP) ................................. 2015-052338
Mar. 16, 2015 (JP) ................................. 2015-052339

(51) Int. Cl.
*H04N 1/00* (2006.01)
*H04M 1/00* (2006.01)
(Continued)

(52) U.S. Cl.
CPC ......... *H04N 1/00214* (2013.01); *G03B 17/48* (2013.01); *H04L 67/06* (2013.01);
(Continued)

(58) Field of Classification Search
CPC ........... H04N 1/00214; H04N 1/00307; H04N 5/23206; H04N 5/23293; H04N 1/00477;
(Continued)

(56) References Cited

U.S. PATENT DOCUMENTS

2007/0098385 A1* 5/2007 Tanaka ............... H04N 5/23209
                                                        348/E5.044
2009/0073269 A1* 3/2009 Yoshida ................ H04N 5/232
                                                           348/207.1
(Continued)

FOREIGN PATENT DOCUMENTS

JP    2004-201073    7/2004
JP    2006-211026    8/2006
(Continued)

OTHER PUBLICATIONS

International Search Report ("ISR") to corresponding International Application No. PCT/JP2016/057957, dated May 24, 2016 (2 pgs.), with translation (1 pg.).
(Continued)

*Primary Examiner* — Jason A Flohre
(74) *Attorney, Agent, or Firm* — John C. Pokotylo; Pokotylo Patent Services

(57) ABSTRACT

A communication device includes a communication unit, a communication function allocation unit, a communication status determination unit, and a communication control unit. The communication unit performs communications with another communication device using a plurality of communication paths. The communication function allocation unit allocates communication functions to each of the communication paths in the communication unit. The communication status determination unit determines a communication status for each of the communication paths. The communication control unit controls communications for each of the communication paths in accordance with allocation by the
(Continued)

communication function allocation unit and a determination result of the communication status determination unit.

14 Claims, 12 Drawing Sheets

(51) Int. Cl.
  *H04M 11/00*   (2006.01)
  *H04N 5/232*   (2006.01)
  *G03B 17/48*   (2006.01)
  *H04L 29/08*   (2006.01)

(52) U.S. Cl.
  CPC ............. *H04L 67/12* (2013.01); *H04M 1/00* (2013.01); *H04M 11/00* (2013.01); *H04N 1/00095* (2013.01); *H04N 1/00137* (2013.01); *H04N 1/00172* (2013.01); *H04N 1/00307* (2013.01); *H04N 1/00477* (2013.01); *H04N 5/23203* (2013.01); *H04N 5/23206* (2013.01); *H04N 5/23293* (2013.01); *G03B 2206/00* (2013.01); *H04N 2201/0039* (2013.01); *H04N 2201/0041* (2013.01); *H04N 2201/0049* (2013.01); *H04N 2201/0055* (2013.01); *H04N 2201/0075* (2013.01); *H04N 2201/0084* (2013.01)

(58) Field of Classification Search
  CPC ........... H04N 5/23203; H04N 1/00095; H04N 2201/0049; H04N 2201/0055; H04N 2201/0075; H04N 2201/0039; H04N 2201/0041; H04N 2201/0084; G03B 17/48; G03B 2206/00; H04L 67/12; H04M 11/00; H04M 1/00
  See application file for complete search history.

(56) References Cited

U.S. PATENT DOCUMENTS

| | | | | |
|---|---|---|---|---|
| 2011/0102618 A1* | 5/2011 | Yamaya | ............. | H04N 5/23209 348/222.1 |
| 2011/0157375 A1* | 6/2011 | Kusumoto | ......... | H04N 1/00347 348/207.1 |
| 2012/0081556 A1* | 4/2012 | Hwang | .............. | H04N 1/00411 348/207.1 |
| 2012/0086818 A1* | 4/2012 | Yamamoto | ......... | H04N 5/23203 348/207.1 |
| 2012/0092714 A1* | 4/2012 | Suzuki | .................. | G06F 3/1212 358/1.15 |
| 2012/0213125 A1 | 8/2012 | Shimomura et al. | | |
| 2014/0362864 A1 | 12/2014 | Sugimoto | | |
| 2015/0049206 A1* | 2/2015 | Eshita | ................. | H04N 5/2251 348/207.11 |
| 2015/0120869 A1* | 4/2015 | Watanabe | .......... | H04N 1/00095 709/217 |

FOREIGN PATENT DOCUMENTS

| | | |
|---|---|---|
| JP | 2013-48399 | 3/2013 |
| JP | 2014-241493 | 12/2014 |
| WO | WO 2013/132559 | 9/2013 |

OTHER PUBLICATIONS

English translation of International Preliminary Report on Patentability ("IPRP") to corresponding International Patent Application No. PCT/JP2016/057957, including a translation of the Written Opinion of the International Searching Authority.

First Office Action to corresponding Japanese Patent Application No. 2015-052339, dated Jul. 3, 2018 (4 pgs.), with translation (5 pgs.).

First Office Action to corresponding Japanese Patent Application No. 2015-052338, dated Oct. 30, 2018 (5 pgs.), with translation (6 pgs.).

Final Office Action to corresponding Japanese Patent Application No. 2015-052339, dated Dec. 18, 2018 (4 pgs.), with translation (5 pgs.).

\* cited by examiner

|  |  | Communication path | | |
|---|---|---|---|---|
|  |  | First | Second | Third |
| Live view transfer (LV) | | 1 | 2 | 3 |
| Live view backup (BU) | | Unused | 1 | 2 |
| Rec view transfer (RV) | | 1 | 2 | 3 |
| File transfer (File) | JPEG | 1 | 2 | 3 |
| | RAW | 1 | 2 | 3 |
| | MOV | 1 | 2 | 3 |
| Command communication (Com) | | 1 | 2 | 3 |
| Information transmission (Info) | | 1 | 2 | 3 |

F I G. 2A

|  |  | Communication path | | |
|---|---|---|---|---|
|  |  | First | Second | Third |
| Live view transfer (LV) | | 1 | 2 | 3 |
| Live view backup (BU) | | Unused | 1 | 2 |
| Rec view transfer (RV) | | 1 | 2 | 3 |
| File transfer (File) | JPEG | Unused | 1 | 2 |
| | RAW | Unused | 1 | 2 |
| | MOV | Unused | 1 | 2 |
| Command communication (Com) | | 1 | 2 | 3 |
| Information transmission (Info) | | Unused | 1 | 2 |

F I G. 2B

|  |  | Communication path | | |
|---|---|---|---|---|
|  |  | First | Second | Third |
| Live view transfer (LV) | | 1 | 2 | 3 |
| Live view backup (BU) | | Unused | 1 | 2 |
| Rec view transfer (RV) | | 1 | 2 | 3 |
| File transfer (File) | JPEG | 1 | 2 | 3 |
|  | RAW | Unused | 1 | 2 |
|  | MOV | Unused | 1 | 2 |
| Command communication (Com) | | 1 | 2 | 3 |
| Information transmission (Info) | | Unused | 1 | 2 |

FIG. 2C

|  |  | Communication path | | |
|---|---|---|---|---|
|  |  | First | Second | Third |
| Live view transfer (LV) | | 1 | 2 | 3 |
| Live view backup (BU) | | Unused | 1 | 2 |
| Rec view transfer (RV) | | 1 | 1 | 2 |
| File transfer (File) | JPEG | 1 | 1 | 1 |
|  | RAW | 1 | 1 | 1 |
|  | MOV | 1 | 1 | 1 |
| Command communication (Com) | | 1 | 2 | 3 |
| Information transmission (Info) | | Unused | 1 | 2 |

FIG. 2D

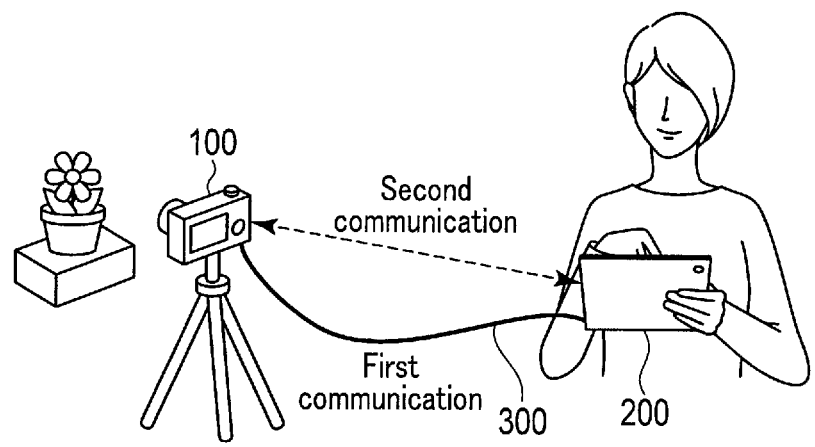
F I G. 3A
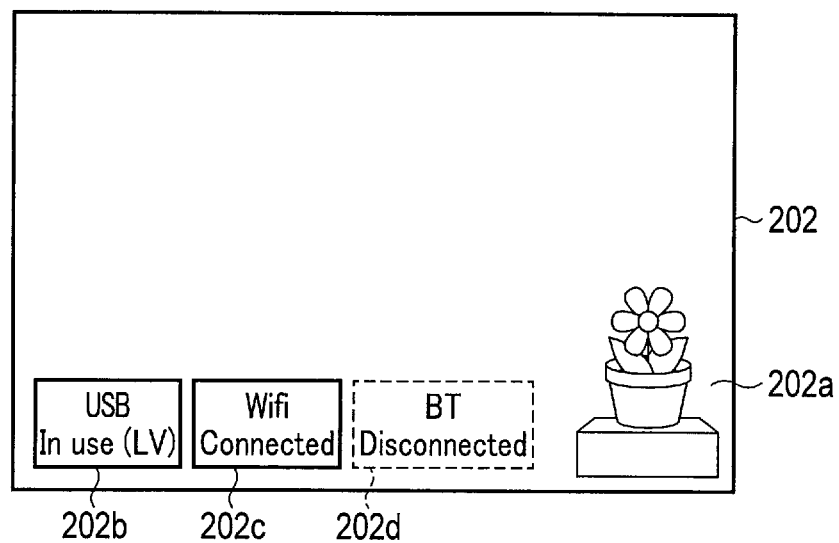
F I G. 3B

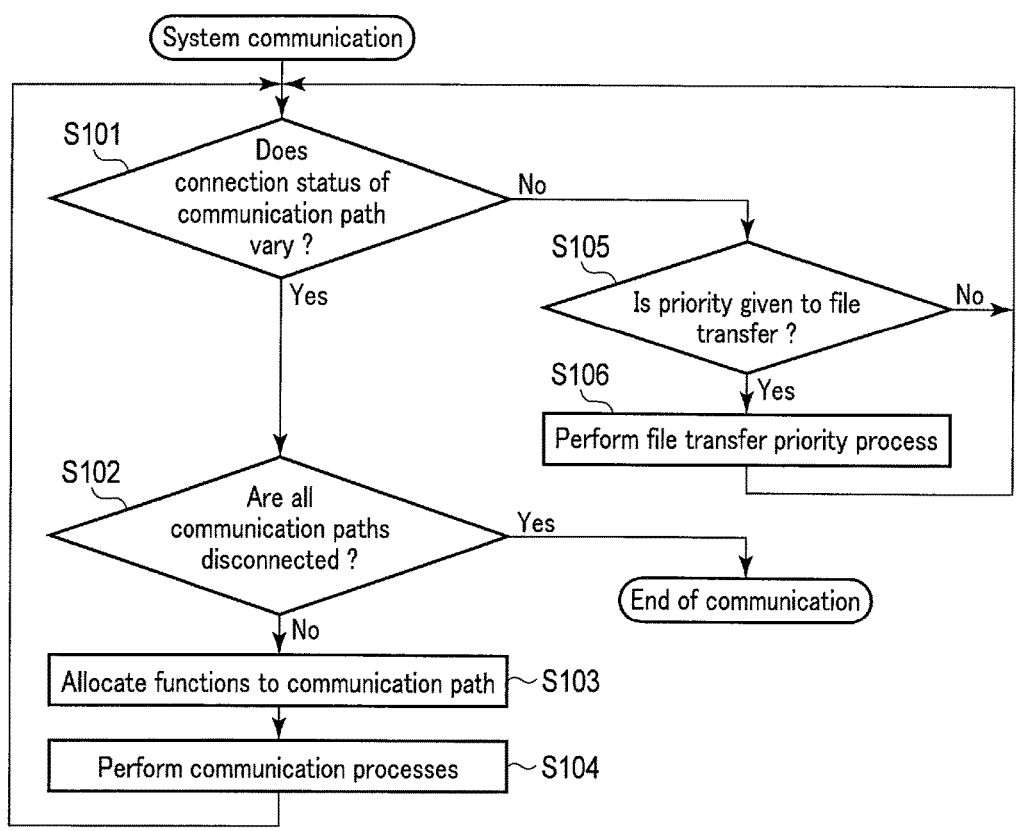
F I G. 4

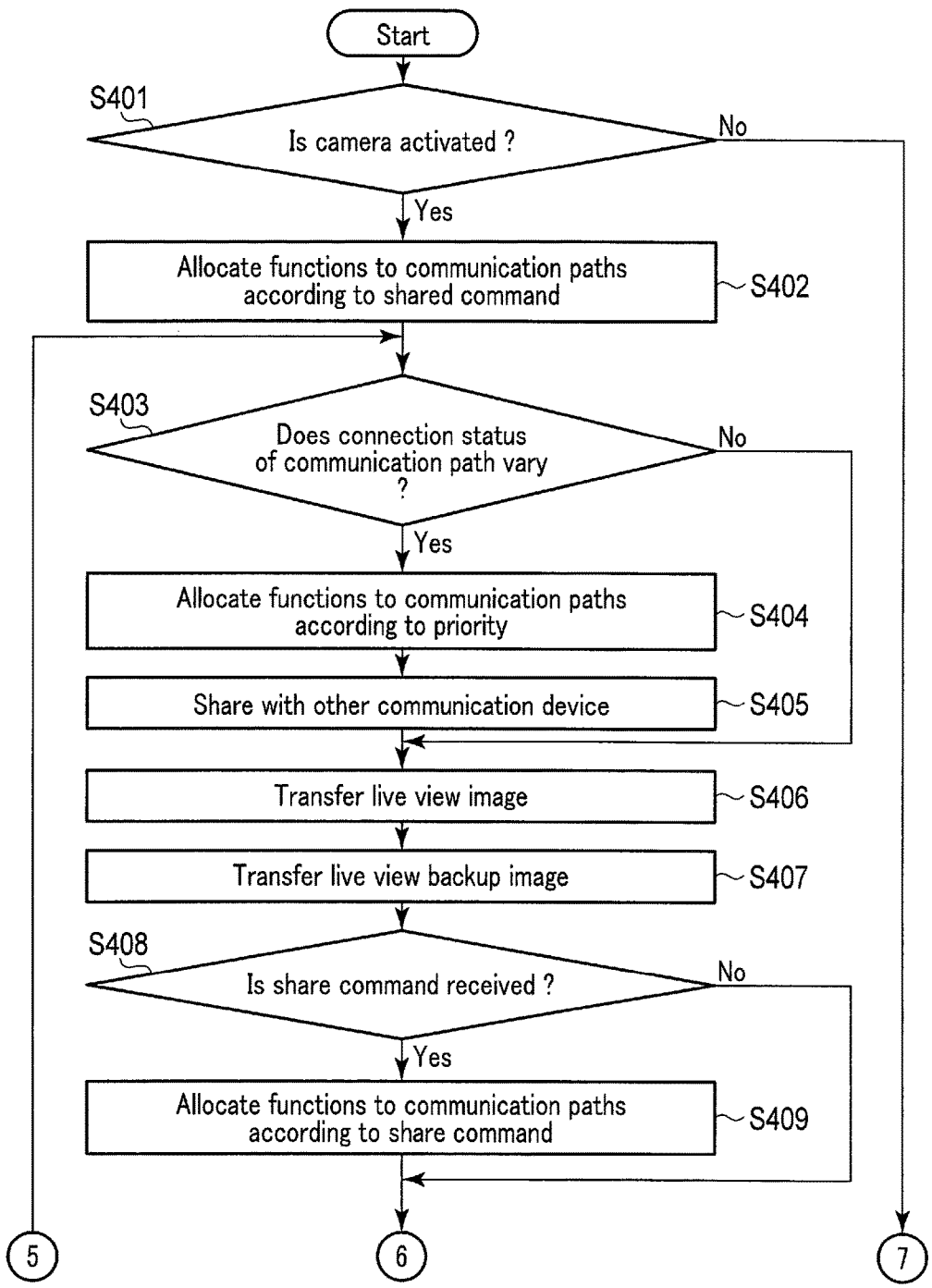
F I G. 7A

COMMUNICATION DEVICE, COMMUNICATION SYSTEM AND COMMUNICATION METHOD

CROSS-REFERENCE TO RELATED APPLICATIONS

This application is a Continuation Application of PCT Application No. PCT/JP2016/057957, filed Mar. 14, 2016 and based upon and claiming the benefit of priority from the prior Japanese Patent Applications No. 2015-052338, filed Mar. 16, 2015, and No. 2015-052339, filed Mar. 16, 2015, the entire contents of all of which are incorporated herein by reference.

BACKGROUND OF THE INVENTION

1. Field of the Invention

The present invention relates to a communication device, a communication system and a communication method.

2. Description of the Related Art

Recently, of communication devices having a communication function, communication devices capable of using a plurality of communication paths have increased. As one example, an imaging device (e.g. a digital camera) capable of using both wire communications and wireless communications is known. For example, Jpn. Pat. Appln. KOKAI Publication No. 2004-201073 discloses a digital camera including an imaging unit and a camera main body unit which are detachably configured. When the imaging unit is attached to the camera main body unit, communications between both the units are performed through wire communications. When the imaging unit is detached from the camera main body unit, communications between both the units are performed through wireless communications. Jpn. Pat. Appln. KOKAI Publication No. 2004-201073 discloses a digital camera in which wireless communications are started at the same time when the detachment is performed by an operation of a detachment switch. Thus, a time lag for which wire communications are switched to wireless communications is shortened.

BRIEF SUMMARY OF THE INVENTION

According to a first aspect of the invention, there is provided a communication device comprising: a communication unit which performs communications with another communication device using a plurality of communication paths; a communication function allocation unit which allocates communication functions to each of the communication paths in the communication unit; a communication status determination unit which determines a communication status for each of the communication paths; and a communication control unit which controls communications for each of the communication paths in accordance with allocation by the communication function allocation unit and a determination result of the communication status determination unit.

According to a second aspect of the invention, there is provided a communication system configured to perform communications between a first communication device and a second communication device, the second communication device comprising: a communication unit which performs communications with the first communication device using a plurality of communication paths; a communication function allocation unit which allocates communication functions to each of the communication paths in the communication unit; a communication status determination unit which determines a communication status for each of the communication paths; and a communication control unit which controls communications for each of the communication paths in accordance with allocation by the communication function allocation unit and a determination result of the communication status determination unit.

According to a third aspect of the invention, there is provided a method for performing communications by a first communication device and a second communication device using a plurality of communication paths, the method comprising: allocating communication functions to each of the communication paths; determining a communication status for each of the communication paths; and controlling communications for each of the communication paths in accordance with the allocating and a result of the determining.

According to a forth aspect of the invention, there is provided a communication device comprising: a communication unit which performs communications with another communication device using a plurality of communication paths; a communication function allocation unit which allocates communication functions to each of the communication paths in the communication unit; and a display control unit which causes a display unit to display a communication status of the communication unit such that the communication status is visually recognized.

According to a fifth aspect of the invention, there is provided a communication system configured to perform communications between a first communication device and a second communication device, the second communication device comprising: a communication unit which performs communications with the first communication device using a plurality of communication paths; a communication function allocation unit which allocates communication functions to each of the communication paths in the communication unit; and a display control unit which causes a display unit to display the communication functions such that the communication functions are visually recognized.

According to a sixth aspect of the invention, there is provided a method for performing communications by a first communication device and a second communication device using a plurality of communication paths, the method comprising: allocating communication functions to each of the communication paths; and causing a display unit to display the communication functions such that the communication functions are visually recognized.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2A is a table showing an example of a priority database;

FIG. 2B is a table showing an example of the priority database;

FIG. 2C is a table showing an example of the priority database;

FIG. 2D is a table showing an example of the priority database;

FIG. 3A is an illustration of an overview of an operation of a communication system;

FIG. 3B is an illustration of an overview of an operation of the communication system;

FIG. 4 is a flowchart showing a conceptual operation of the communication system;

FIG. 7A is a first flowchart showing an operation of a camera function as a specific example of an operation of a communication device 100;

DETAILED DESCRIPTION OF THE INVENTION

Figure 1:
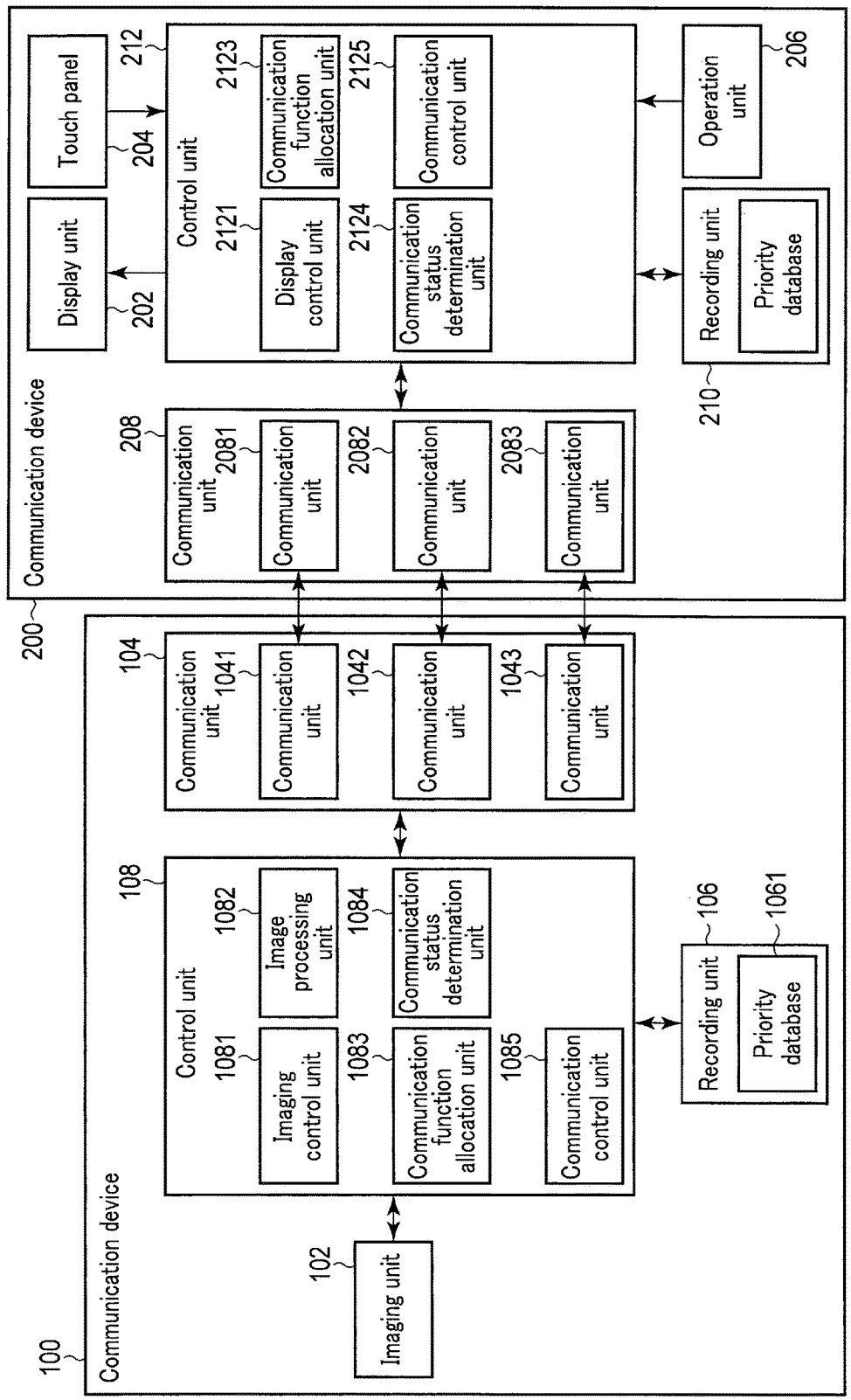
FIG. 1 is a diagram showing a configuration of a communication system including communication devices according to one embodiment of the present invention.

An embodiment of the present invention will be described below with reference to the drawings. FIG. 1 is a diagram showing a configuration of a communication system including communication devices according to one embodiment of the present invention. The communication system includes a plurality of communication devices (a communication device 100 and a communication device 200 in the example of FIG. 1). The communication devices 100 and 200 are so configured that they can freely communicate with each other through a plurality of communication paths. The communication device 100 is, for example, a lens-type imaging device having no display unit. The communication device 200 is, for example, a smartphone.

The communication device 100 serves as a first communication device and includes an imaging unit 102, a communication unit 104, a recording unit 106 and a control unit 108.

The imaging unit 102 includes an imaging lens, an imager, an analog/digital (A/D) conversion circuit, and the like. The imaging lens is an optical system for forming an image of an object, not shown, on the imager. The imager converts the image of an object formed through the imaging lens into an electrical signal (image signal). The A/D conversion circuit converts the image signal obtained by the imager into a digital signal (image data).

The communication unit 104 performs communications with at least the communication device 200. The communication unit 104 includes a plurality of communication units (three of a first communication unit 1041, a second communication unit 1042 and a third communication unit 1043 in the example of FIG. 1) which correspond to the communication paths. The first communication unit 1041 performs, for example, USB communications. The second communication unit 1042 performs, for example, Wi-Fi (registered trademark) communications. The third communication unit 1043 performs, for example, Bluetooth (registered trademark) communications.

The recording unit 106 is, for example, a flash memory built in the communication device 100. On the recording unit 106, a taken image generated in the control unit 108 is recorded in image file format. Furthermore, on the recording unit 106, a priority database 1061 is recorded. The priority database 1061 is a database that stores settings of priority of the communication paths used for the communication functions of the communication unit 104.

FIGS. 2A to 2D are tables each showing an example of the priority database 1061. In each of the examples of FIGS. 2A to 2D, "1" represents the highest priority and "3" represents the lowest priority. Basically, a high priority is given to a communication path capable of performing large-capacity communications. For example, the USB communications allow larger-capacity communications to be performed than the Wi-Fi communications and Bluetooth communications. Therefore, basically, the first communication unit 1041 is given a higher priority than the second communication unit 1042 and the third communication unit 1043. Moreover, the Wi-Fi communications allow larger-capacity communications to be performed than the Bluetooth communications. Therefore, basically, the second communication unit 1042 is given a higher priority than the third communication unit 1043.

FIGS. 2A to 2D also show, as examples of communication functions, settings of priority regarding a live view transfer function (LV), a live view backup function (BU), a rec view transfer function (RV), a file transfer function (File), a command communication function (Com) and an information communication function (Info). The live view transfer function is a function of transferring image data for live view display. The live view backup function is a function of transferring backup image data for live view display when a communication unit that is transferring a live view is cut off. Since the live view backup function is fulfilled as backup, it does not employ the same communication path as the live view transfer. Furthermore, the live view backup function may not be used according to a user's setting, for example. The rec view transfer function is a function of transferring a taken image to display the taken image on the display unit of the communication device 200 immediately after the image is taken. The file transfer is a function of transferring an image file recorded on the recording unit 106, for example. The file transfer function is divided into three of JPEG file transfer, RAW file transfer and moving image (MOV) file transfer, and priority is set for each of these files. The command communication function is a function of communicating control commands of the communication device 100. The control commands include a camera function starting command, an image-taking command, and the like. The information communication function is a function of communicating information of the communication device 100. The information includes a type of the communication device 100, imaging conditions, and the like.

FIG. 2A shows an example of a setting to perform communications by giving a highest priority to the first communication unit 1041. In the example of FIG. 2A, the live view transfer function, rec view transfer function, file transfer function, command communication function and information communication function are allocated to the first communication unit 1041, while the live view backup function is allocated to the second communication unit 1042.

FIG. 2B shows an example of a setting to perform communications by giving priority to the live view transfer function over the other transfer functions. In the example of FIG. 2B, the live view transfer function, rec view transfer function and command communication function are allocated to the first communication unit 1041, while the live view backup function, file transfer function and information communication function are allocated to the second communication unit 1042. In the example of FIG. 2B, a sufficient communication capacity for the live view transfer can be secured by reducing the communication functions to be allocated to the first communication unit 1041.

FIG. 2C shows an example of a setting made when a real time response is required. In contrast to the example of FIG. 2B, in the example of FIG. 2C, the JPEG file transfer is allocated to the first communication unit 1041. If only the live view transfer, rec view transfer and JPEG file transfer are performed by the first communication unit 1041, a taken image can be confirmed and transferred quickly.

FIG. 2D shows an example of a setting made when the file transfer is considered to be important. In contrast to the example of FIG. 2A, in the example of FIG. 2D, the file transfer is allocated to a plurality of communication units. In this example, one file is divided into a plurality of files, and these files are transferred in parallel by the communication units and connected to the files divided in the communication device 200. Since the transfer is performed by a plurality of communication units, high-speed communications can be carried out.

The settings shown in FIGS. 2A to 2D are stored in the priority database 1061 and read out by the control unit 108 when necessary. In accordance with the read settings, the communication functions are allocated. As a result of this allocation, when each of the communication functions is fulfilled, one of the connected communication units which has a top priority is used; however, a communication unit that is set unused is not used even though it is connected. For example, when a communication path for the first communication unit 1041 is connected while the settings in FIG. 2A are stored in the priority database 2101, the control unit 212 allocates the live view transfer function, rec view transfer function, file transfer function, command communication function and information communication function to the first communication unit 1041. The control unit 212 also allocates the live view backup function to the second communication unit 1042. On the other hand, when communication paths for the second and third communication units 1042 and 1043 are connected and a communication path for the first communication unit 1041 is disconnected, the control unit 212 allocates the live view transfer function, rec view transfer function, file transfer function, command communication function and information communication function to the second communication unit 1042.

The settings of the priority database 1061 are effective when at least two communication units are connected. When only one communication unit is connected, the connected communication unit is used irrespective of the contents of the priority database 1061.

The settings shown in FIGS. 2A to 2D are one example and can be modified as appropriate. The priority database 1061 need not store all of the settings shown in FIGS. 2A to 2D. A user may set the contents of the priority database 1061. In this way, the devices and equipment vary in communication priority and data capacity according to their functions, and it is favorable that the optimum communication or failsafe communication be selected appropriately for each function according to the circumstances. They also vary in their important functions according to the circumstances. For example, a real-time image transfer is important when a setting is made before the start of observation of an object and a high-definition image is important at the time of observation and image taking. As a feature, image data is heavy and commands are light in terms of communications.

The control unit 108 is configured by a CPU and an ASIC to control the whole operation of the communication device 100. The control unit 108 includes an imaging control unit 1081, an image processing unit 1082, a communication function allocation unit 1083, a communication status determination unit 1084 and a communication control unit 1085. The imaging control unit 1081 controls an imaging operation of the imaging unit 102. The image processing unit 1082 performs various types of image processing for image data captured by the imaging unit 102 to generate live view image data, taken image data and the like. The communication function allocation unit 1083 allocates a communication function to each of the communication units of the communication unit 104 in accordance with the settings of the priority database 1061. The communication status determination unit 1084 determines a connection status of the communication path for each of the communication units of the communication unit 104. The communication control unit 1085 controls communications of the communication units in accordance with the allocation of the communication function allocation unit 1083. The communication status determination unit 1084 can determine not only communication itself but also the environment and conditions of the communication device. If the communication status determination unit 1084 includes GPS, altimeter, thermometer and battery check functions, it can determine communications including results of these functions.

The communication device 200 serves as a second communication device and includes a display unit 202, a touch panel 204, an operation unit 206, a communication unit 208, a recording unit 210 and a control unit 212. The communication unit 200 includes at least a camera application for providing a user with a camera function by controlling the communication device 100.

The display unit 202 is, for example, a liquid crystal display and displays various images. For example, the display unit 202 displays live views based upon live view image data transferred from the communication device 100 and images based upon image files recorded in the recording unit 106.

The touch panel 204 is provided to lie on the display screen of the display unit 202. The touch panel 204 detects a user's touch operation. The operation unit 206 is an operation unit such as a power button, which is separate from the touch panel 204.

The communication unit 208 performs communications with at least the communication device 100. The communication unit 208 includes communication units (three of a first communication unit 2081, a second communication unit 2082 and a third communication unit 2083 in the example of FIG. 1) which correspond to the communication paths. The first communication unit 2081 performs, for example, USB communications. The second communication unit 2082 performs, for example, Wi-Fi communications. The third communication unit 2083 performs, for example, Bluetooth communications.

The recording unit 210 is, for example, a flash memory built in the communication device 200. On the recording unit 210, applications for performing various functions are recorded. Furthermore, on the recording unit 210, a priority database 2101 that is the same as that of the communication device 100 is recorded.

The control unit 212 is configured by a CPU and an ASIC to control the whole operation of the communication device 200. The control unit 212 includes a display control unit 2121, a communication function allocation unit 2123, a communication status determination unit 2124 and a communication control unit 2125. The display control unit 2121 controls a display operation of the display unit 202. The display control unit 2121 also displays the condition of a communication path on the display unit 202. The communication function allocation unit 2123 allocates a communication function to each of the communication units of the communication unit 208 in accordance with the settings of the priority database 2101. The communication status determination unit 2124 determines a connection status of the communication path for each of the communication units of the communication unit 208. The communication control unit 2125 controls communications of the communication units in accordance with the allocation of the communication function allocation unit 2123.

An operation of the communication system according to the present embodiment will be described below. In the following descriptions, the first communication unit 1041 of the communication device 100 and the first communication unit 2081 of the communication device 200 will be simply referred to as a first communication unit unless otherwise specified in particular. Similarly, the second communication unit 1042 of the communication device 100 and the second communication unit 2082 of the communication device 200 will be simply referred to as a second communication unit. Furthermore, the third communication unit 1043 of the communication device 100 and the third communication unit 2083 of the communication device 200 will be simply referred to as a third communication unit.

The communication device 100 is, for example, a lens-type imaging device. The lens-type imaging device includes a lens barrel housing having the blocks shown in FIG. 1. The communication device 100 as a lens-type imaging device is connected to the communication device 200 through a cable 300 as shown in FIG. 3A, for example. At this time, a communication path for the first communication unit of the communication devices 100 and 200 is connected. In the present embodiment, when a communication path for one of the first, second and third communication units is connected, a try to connect communication paths for the remaining communication units is made. FIG. 3A shows an example where Wi-Fi communications are established by the second communication unit and Bluetooth communications are not established by the third communication unit.

In the state as shown in FIG. 3A, a user operates the communication device 200 to start a camera application. At this time, as shown in FIG. 3B, the display unit 202 of the communication device 200 displays a live view image 202a transferred from the communication device 100 to the communication device 200. In the present embodiment, furthermore, it also displays icons 202b, 202c and 202d indicating a status of a communication path between the communication device 100 and the communication device 200. For example, the status of a communication path represents whether a corresponding communication path is used for the current communication, whether a corresponding communication path is simply connected, and whether a corresponding communication path is disconnected. The icon 202b shows a status of a communication path for the first communication unit. In the example of FIG. 3B, the icon 202b shows "in use (LV)." A user can thus know that the first communication unit is used for the live view transfer. The icon 202c shows "connected." A user can thus know that a communication path for the second communication unit is connected and not used for data communications. The icon 202d shows "disconnected." A user can thus know that a communication path for the third communication unit is disconnected. The example shown in FIG. 3B is character display; however, needless to say, the display is not limited to character display.

Figure 3C:
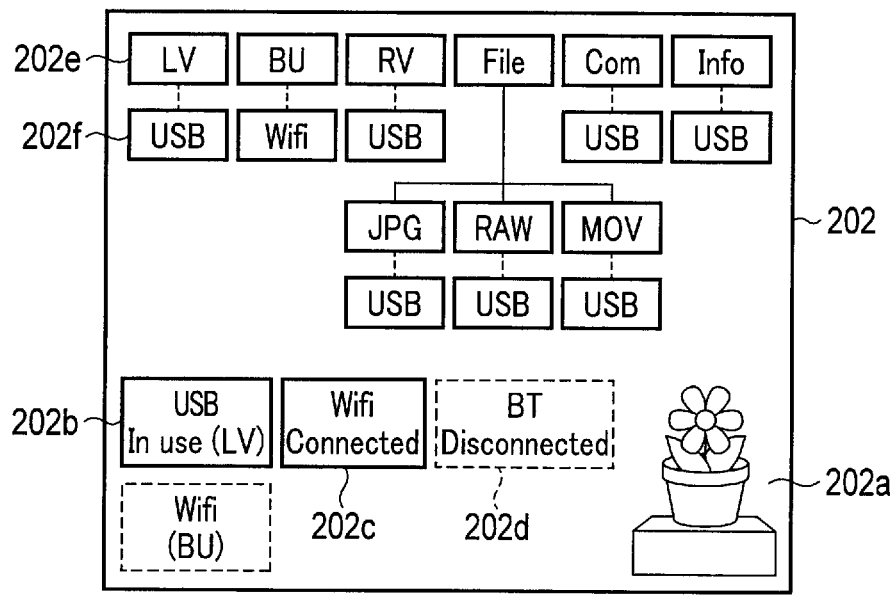
FIG. 3C is an illustration of an overview of an operation of the communication system.

To change allocation of a communication function, a user touches, for example, one of the icons 202b, 202c and 202d. Then, a list of allocation of communication functions for each of the current communication paths is displayed, as shown in FIG. 3C. This list includes an icon 202e showing a communication function available between the communication devices 100 and 200 and an icon 202f showing a communication path associated with each of the communication functions. For example, when a user touches the icon 202f, a list of the communication paths is displayed. The user selects a desired communication path. Accordingly, the communication device 200 changes allocation of a communication function for the communication path. This allocation is shared with the communication device 100. As an important function, display showing that failsafe communications are available even though the current communication is broken down can be made. The user can thus be provided with a sense of security such as that even though a USB is disconnected, it can be replaced with Wi-Fi.

Figure 3D:
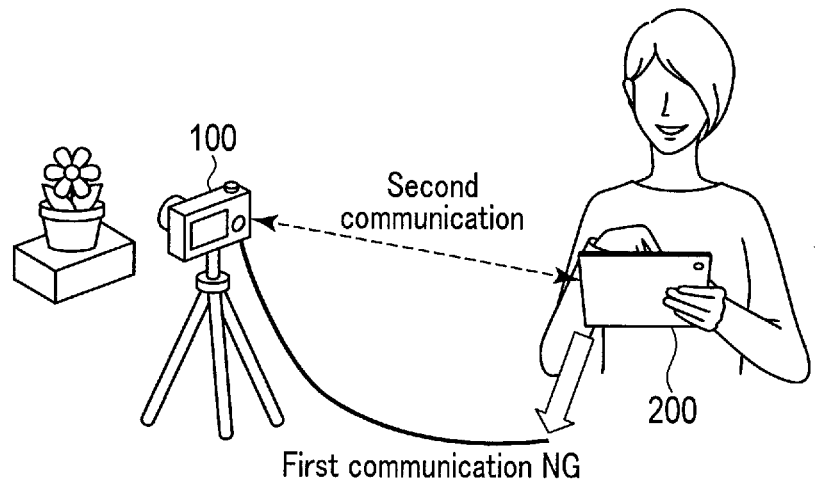
FIG. 3D is an illustration of an overview of an operation of the communication system.

When communication functions are allocated to their respective communication paths, if a high-priority one of the communication paths is disconnected, a lower-priority communication path is used to perform communications. For example, as shown in FIG. 3D, when the cable 300 is detached from the communication device 200 to disconnect a communication path for the first communication unit, the connected communication path for the second communication unit is used to perform communications. Since communications are performed through the communication path that has already been connected, an influence of disconnection of the communication path can be minimized. It is thus possible to minimize an opportunity loss due to the interruption of concentrated operation. This advantage (failsafe effect) can be expected by negotiation between devices as to what alternative communication should be performed when communication is broken down (no good). The failsafe effect can be attained even by making the same setting to the devices in advance irrespective of whether communication is performed or not. As the candidates for the corresponding device increase, or in scenes of different circumstances, failsafe measures vary from scene to scene. If, therefore, the next candidate is chosen in the current communication, it can be adapted to the circumstances more flexibly. In this failsafe command communications, it is unnecessary to process data that is heavier than that in image communications. The communications can thus be shared among devices quickly and simply. Therefore, failsafe measures can be chosen as circumstances demand for each of the scenes and conditions to allow communications and negotiations. As an example of the conditions, there are cases where communications become slow, a battery becomes exhausted, a place is moved, temperature becomes low, a requested communication speed changes, wireless communications cannot be used and the like as well as "a case where communications are broken." These conditions will be simply listed below because their descriptions become complicated.

Change of place (near→far): function A, communication method X, function B, communication method X
Change of place (far→near): function A, communication method Y, function B, communication method Y
Decrease in temperature: function A, communication method X, function B, communication method Z
Exhaustion of battery: function A, communication method Z, function B, communication method Z Needless to say, it is better to change the failsafe communication method to the optimum type according to device's power design, antenna design, connector design and the like. There is a case where wire communications become failsafe communications and, in this case, the following method is executed: the corresponding control such as that a connector section is made effective is carried out and a user is informed of an advice suggesting a wire connection with audio and visual information. Some communication methods need setting of passwords to ensure security, and such a procedure is automatically performed in advance in this negotiation.

FIG. 4 is a flowchart showing a conceptual operation of the communication system according to the present embodiment. The process shown in FIG. 4 is performed by at least one of the control unit 212 of the communication device 200 and the control unit 108 of the control device 100. Both of the control units will be referred to as the control unit below without distinguishing them.

In step S101, the control unit determines whether a connection status of a communication path varies. The case where a connection status of a communication path varies is a case where a communication path that was not connected is newly connected or a case where a communication path that has been connected is disconnected. When it is determined in step S101 that a connection status of a communication path varies, the process shifts to step S102. When it is determined in step S101 that a connection status of a communication path does not vary, the process shifts to step S105.

In step S102, the control unit determines whether all of the communication paths are disconnected. When it is determined in step S102 that all of the communication paths are disconnected, the process of FIG. 4 is completed. When it is determined in step S102 that all of the communication paths are not disconnected, the process shifts to step S103.

In step S103, the control unit allocates the communication functions to a communication path in accordance with the status of the current communication path and the contents of the priority database. At this time, the control unit refers to the priority database and allocates the communication functions to the highest-priority one of the communication paths that are connected. In addition, not only a process of reducing the size of image data transferred in other communications such as a live view transfer and raising its compression rate, but also a process of decreasing a frame rate of the transfer can be considered. After that, the process shifts to step S104. In other words, when the communication control unit determines that a communication path is disconnected, a higher-priority one of the other communication paths is selected according to the preset priority to restart the communications. Thus, various operations other than the communications can be continued. If the mode or contents of communications are changed according to the characteristics of the communication path, the communications can be performed more easily.

In step S104, the control unit performs various communication processes using a communication unit to which the communication functions are allocated in step S103. After that, the process returns to step S101.

In step S105, the control unit determines whether priority is given to a file transfer. The case where priority is given to a file transfer is, for example, a case where a large number of image files should be transferred. When it is determined in step S105 that priority is not given to a file transfer, the process returns to step S101. When it is determined in step S105 that priority is given to a file transfer, the process shifts to step S106.

In step S106, the control unit performs a file transfer priority process. After that, the process returns to step S101. The file transfer priority process is, for example, a process of allocating the function of a file transfer to a plurality of communication paths as shown in FIG. 2D. In addition, not only a process of reducing the size of image data transferred in other communications such as a live view transfer and raising its compression rate, but also a process of decreasing a frame rate of the transfer can be considered.

Figure 5:
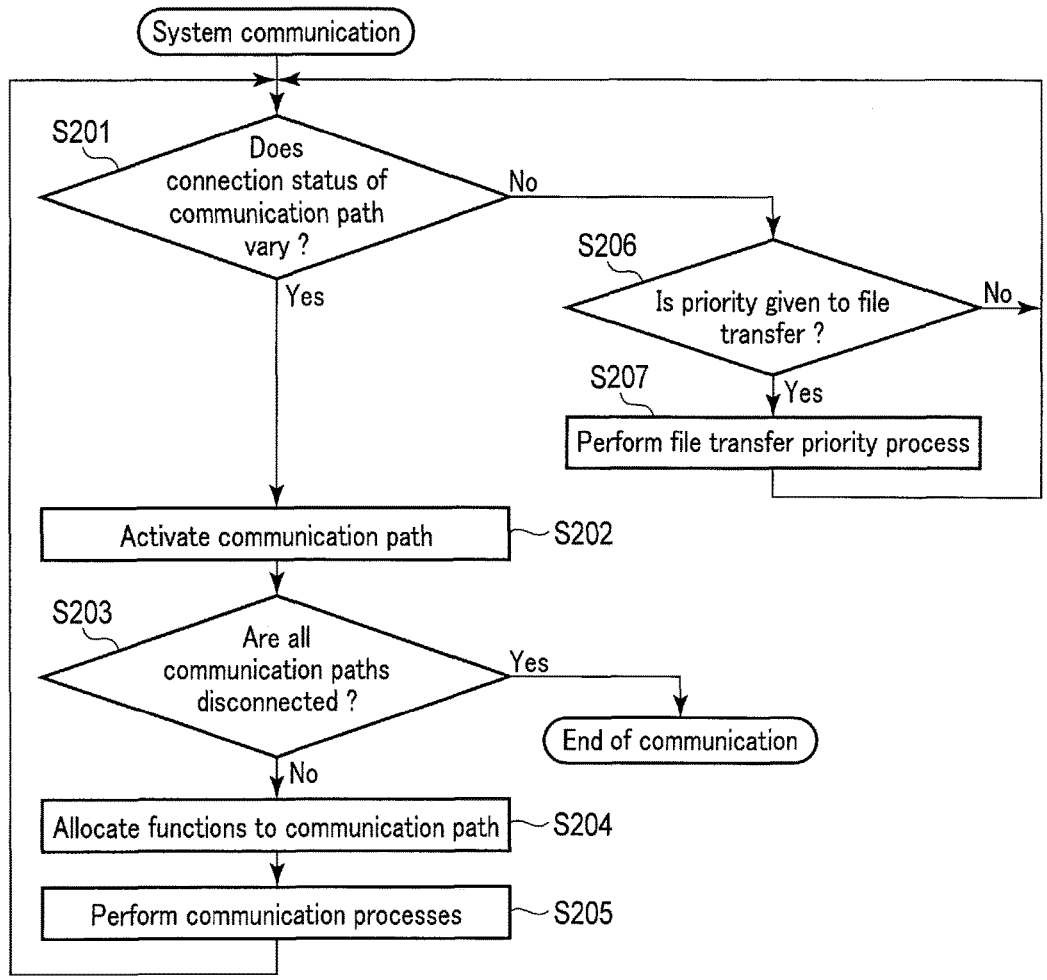
FIG. 5 is a flowchart showing a modification to the conceptual operation of the communication system.

FIG. 5 is a flowchart showing a modification to the conceptual operation of the communication system according to the present embodiment. The process shown in FIG. 5 is also performed by at least one of the control unit 212 of the communication device 200 and the control unit 108 of the control device 100. Both of the control units will be referred to as the control unit below without distinguishing them.

In step S201, the control unit determines whether a connection status of a communication path varies. When it is determined in step S201 that a connection status of a communication path varies, the process shifts to step S202. When it is determined in step S201 that a connection status of a communication path does not vary, the process shifts to step S206.

In step S202, the control unit activates a communication path. After that, the process shifts to step S203. For example, when a connection of a communication path by the first communication unit is confirmed and the second communication unit is connected, the control unit tries to activate a communication path by the third communication unit. Furthermore, for example, when a disconnection of a communication path by the first communication unit is confirmed and the second communication unit is connected, the control unit tries to activate communication paths by the first and third communication units.

In step S203, the control unit determines whether all of the communication paths are disconnected. When it is determined in step S203 that all of the communication paths are disconnected, the process of FIG. 5 is completed. When it is determined in step S203 that all of the communication paths are not disconnected, the process shifts to step S204.

In step S204, the control unit allocates the communication functions to a communication path in accordance with the status of the current communication path and the contents of the priority database. In addition to the communication method, not only a process of reducing the size of image data transferred in other communications such as a live view transfer and raising its compression rate, but also a process of decreasing a frame rate of the transfer can be considered. After that, the process shifts to step S205.

In step S205, the control unit performs various communication processes using a communication unit to which the communication functions are allocated in step S204. After that, the process returns to step S201.

In step S206, the control unit determines whether priority is given to a file transfer. When it is determined in step S206 that priority is not given to a file transfer, the process returns to step S201. When it is determined in step S206 that priority is given to a file transfer, the process shifts to step S207.

In step S207, the control unit performs a file transfer priority process. After that, the process returns to step S201.

Figure 6A:
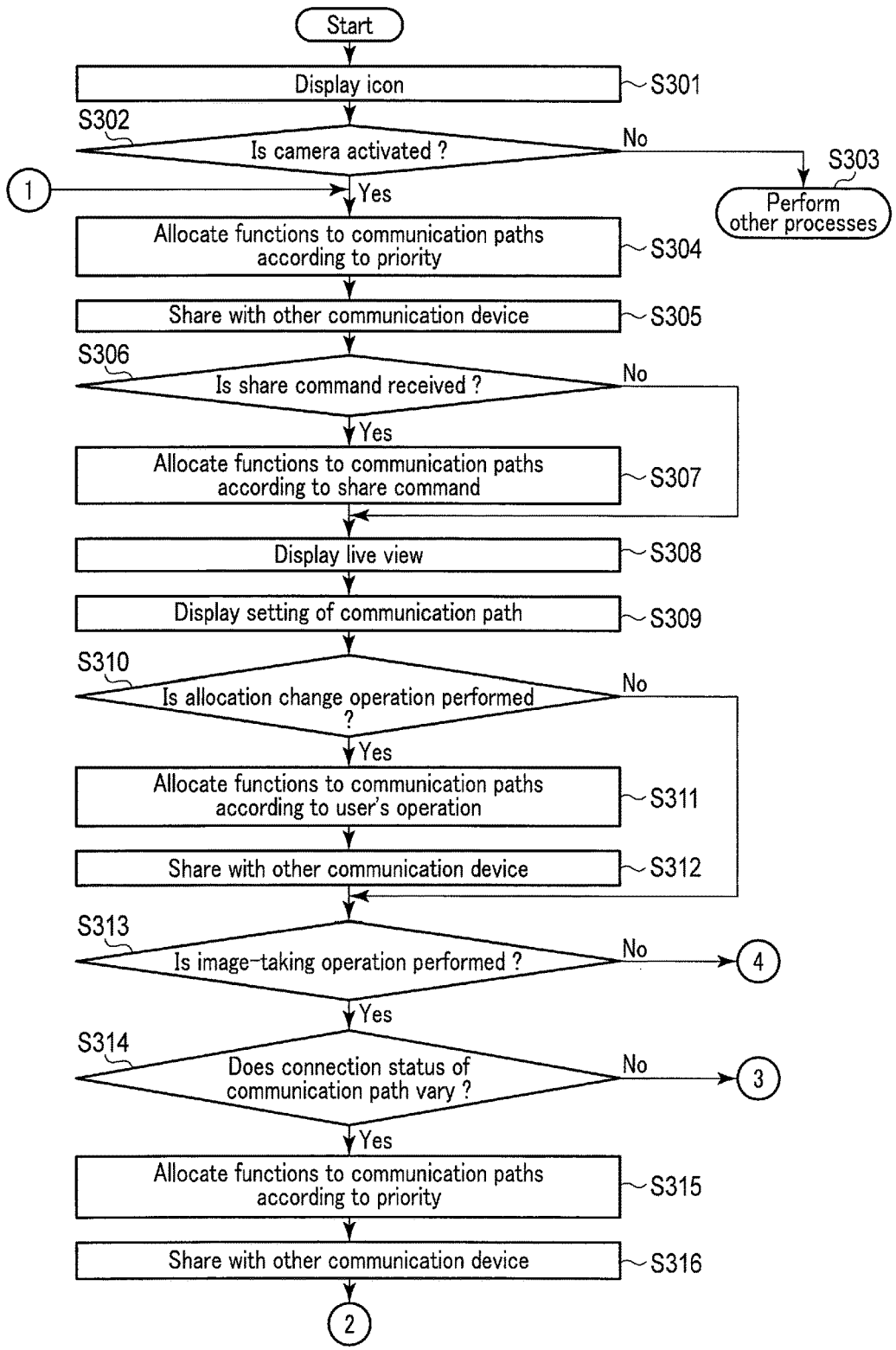
FIG. 6A is a first flowchart showing an operation of a camera function as a specific example of an operation of a communication device 200 in the communication system.
Figure 6B:
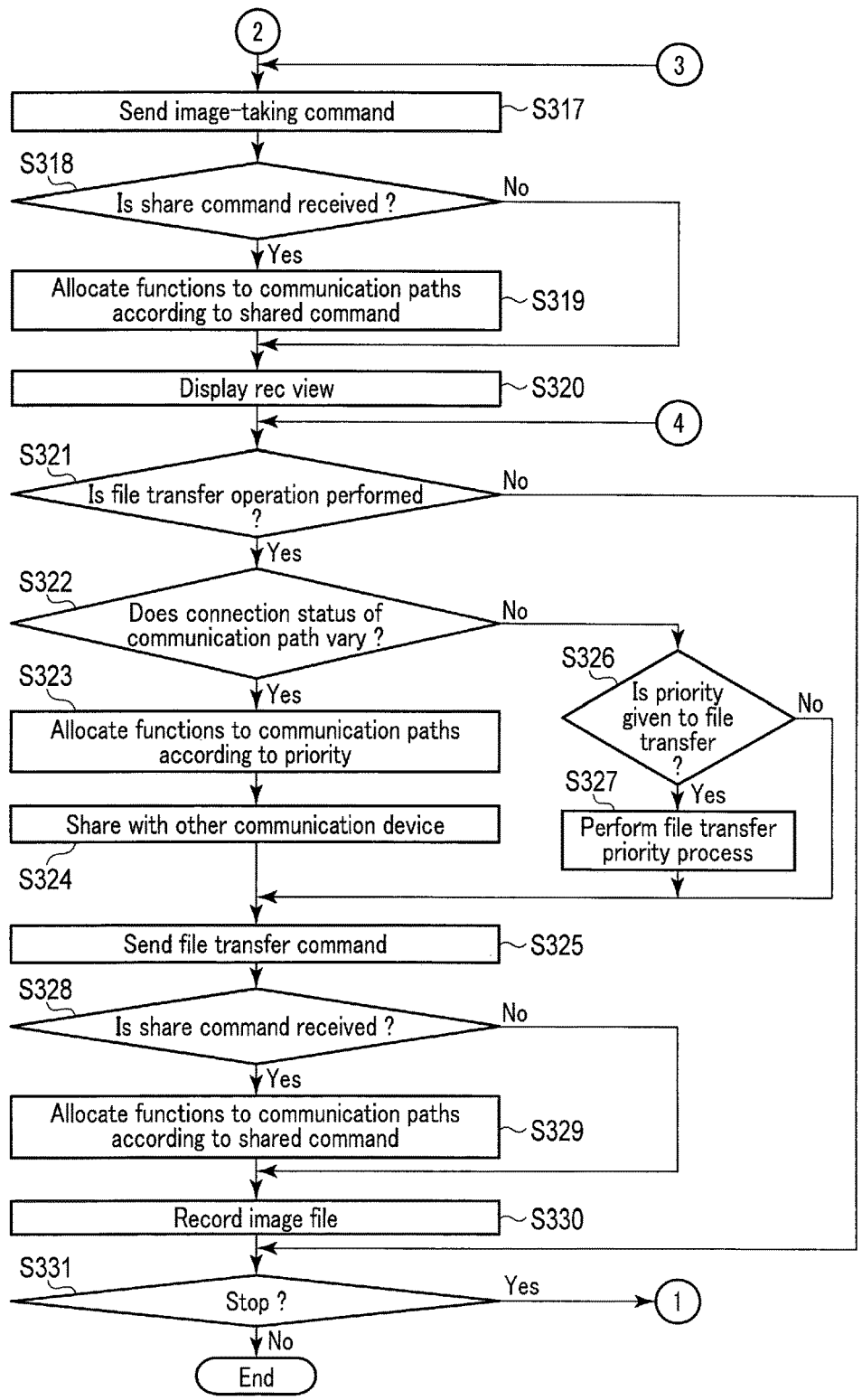
FIG. 6B is a second flowchart showing the operation of the camera function as a specific example of the operation of the communication device 200.

FIGS. 6A and 6B are flowcharts showing an operation performed when a camera function is selected by an application of the communication device 200 in the communication system of the present embodiment as a specific example of the operation of the communication device 200. The process shown in FIGS. 6A and 6B is controlled by the control unit 212. The process shown in FIGS. 6A and 6B is a specific example of the process shown in FIG. 4. Like in the process shown in FIG. 5, a process of activating a communication path can be added.

In step S301, the control unit 212 causes the display unit 202 to display an icon representing an application recorded on the recording unit 210. The icon includes an icon corresponding to at least a camera application.

In step S302, the control unit 212 determines whether an instruction to activate a camera is given. For example, it is determined that an instruction to activate a camera is given when an icon of the camera application displayed on the display unit 202 is touched. When it is determined in step S302 that an instruction to activate a camera is not given, the process shifts to step S303. When it is determined in step S302 that an instruction to activate a camera is given, the process shifts to step S304.

In step S303, the control unit 212 performs other processes. The other processes include, for example, a process about a phone function and a process about an electronic mail function. Detailed descriptions of the other processes will be omitted.

In step S304, the control unit 212 allocates the communication functions to each of the communication paths according to the settings of the priority database 2101. Then, the control unit 212 refers to the priority database 2101 and allocates the communication functions to the highest-priority one of the communication paths that are connected. The initial settings of the priority database 2101 are those shown in FIG. 2A, for example.

In step S305, the control unit 212 sends a share command to the communication device 100 using a communication path for command communications. The share command is a command for sharing the settings for allocating the communication functions with the communication device 100.

In step S306, the control unit 212 determines whether it receives the share command from the communication device 100. When it is determined in step S306 that the control unit receives the share command from the communication device 100, the process shifts to step S307. When it is determined in step S306 that the control unit does not receive the share command from the communication device 100, the process shifts to step S308. There is a case where the communication device 100 (imaging device) has no function of sending a share command. In this case, these processes are unnecessary and can be replaced with another alternative means such as network communications, insertion of a memory card, settings by a PC and the like.

In step S307, the control unit 212 changes allocation of the communication paths according to the allocation settings of the communication functions or the share command. In step S308, the control unit 212 receives a live view image through a communication path for live view transfer and also receives a live view backup image through a communication path for live view backup. Then, the control unit 212 causes the display unit 202 to display a live view on the basis of the live view image or the live view backup image. When the control unit 212 receives both the live view image and the live view backup image, it causes the display unit 202 to display a live view on the basis of the live view image. On the other hand, when the control unit 212 receives only the live view backup image, it causes the display unit 202 to display a live view on the basis of the live view backup image.

In step S309, the control unit 212 causes the display unit 202 to display the icons 202b, 202c and 202d as shown in FIG. 3B, which represent the statuses of the communication paths between the communication device (imaging device, etc.) 100 and the communication device (smartphone, etc.) 200. A user can thus perform an operation of a device in a carefree manner while confirming a communication status, a failsafe against a malfunction of communications and the like. The icons play an important role in making a decision and performing various operations such as that a connection status is switched according to the circumstances. This idea is particularly effective because unlike wire communications, wireless communications make it difficult to know a communication status visually. Furthermore, a communication setting can be made for each of the functions of a device.

In step S310, the control unit 212 determines whether a user performs an operation to change allocation of the communication functions. For example, it is determined that an operation to change the allocation is performed when a communication path is selected on the screen as shown in FIG. 2C. When it is determined in step S310 that a user performs an operation to change allocation of the communication functions, the process shifts to step S311. When it is determined in step S310 that a user does not perform an operation to change allocation of the communication functions, the process shifts to step S313. As an important function, display showing that failsafe communications are available even though the current communication is broken down can be made. The user can thus be provided with a sense of security such as that even though a USB is disconnected, it can be replaced with Wi-Fi. For example, a failsafe step and a replacement step are added here because an observation operation is very important in the example of a camera. If this image observation is broken, no images can be observed visually, thereby providing the user with such an impression as if a device were broken. If the user loses an object to be observed, he or she will make an error in judgment. Furthermore, in most cases, the user operates a device based upon a result of observation, and there is a case where the user adjusts the focus and exposure while looking at the result of observation or controls movement of the device itself. Assuming this, it is important to choose other communication as a failsafe at the time of a live view. This failsafe can be accompanied with not only a communication connection for the live view but also a change in frame rate and image quality. Negotiations including these matters are important. Needless to say, it is important to take these measures as appropriate according to the purpose of the device, irrespective of a live view (observation). For the sake of brevity, these processes are performed with the timing of step S310.

In step S311, the control unit 212 allocates the communication functions to each of the communication paths according to a user's operation. In step S312, the control unit 212 sends the share command to the communication device 100 using a communication path for command communications. Thus, the contents of the change in allocation of communication functions, which is made in the communication device 200, are shared with the communication device 100, too. The reason is as follows. This example is described based upon an example where a user has the communication device 200 in hand. Of course, the example can be applied to a process of sending the share command from the communication device 100 to the communication device 200 for negotiations. Furthermore, it is assumed that another operation device provides a remote communication device 200 with an instruction to set the communication device 100. In the present invention, the communication settings can be changed frequently for each of the functions. Therefore, an operation device could make settings for the communication devices 100 and 200 at the same time.

In step S313, the control unit 212 determines whether a user performs an image-taking operation. For example, when a given button of the operation unit 206 is operated or when a touch release operation is performed through the touch panel 204, it is determined that a user performs an image-taking operation. When it is determined in step S313 that a user performs an image-taking operation, the process shifts to step S314. When it is determined in step S313 that a user does not perform an image-taking operation, the process shifts to step S321.

In step S314, the control unit 212 determines whether the connection status of a communication path varies. When it is determined in step S314 that the connection status of a communication path varies, the process shifts to step S315. When it is determined in step S314 that the connection status of a communication path does not vary, the process shifts to step S317.

In step S315, the control unit 212 allocates the communication functions to each of the communication paths according to the settings of the priority database 2101. In step S316, the control unit 212 sends the share command to the communication device 100 using a communication path for command communications. Thus, the contents of the change in allocation of communication functions, which is made in the communication device 200, are shared with the communication device 100, too. For example, a failsafe step and a replacement step are added here because an image-taking operation is very important in the example of a camera. Needless to say, it is important to take these measures as appropriate according to the purpose of the device, irrespective of image taking. For the sake of brevity, these processes are added particularly after YES in step S313.

In step S317, the control unit 212 sends an image-taking command to the communication device 100 using a communication path for command communications.

In step S318, the control unit 212 determines whether it receives the share command from the communication device 100. When it is determined in step S318 that the control unit receives the share command from the communication device 100, the process shifts to step S319. When it is determined in step S318 that the control unit does not receive the share command from the communication device 100, the process shifts to step S320.

In step S319, the control unit 212 changes allocation of the communication paths in response to the share command. Thus, the contents of the change in allocation of communication functions, which is made in the communication device 200, are shared with the communication device 100, too. These ideas correspond to the content that negotiations as to whether a communication method is set for each function between devices or how failsafe is set are made in advance. As described above, therefore, it does not matter which device is designated by which device. An example where a device having functions that are actually controlled makes a request that conforms to each of the functions, is described; however, there is a case where the functions of the device are grasped by another communication device. A device whose computing speed is high may determine a communication status and the capability of the other device to designate a share command. At this time, it can share the functions with the other device in cooperation with a network.

In step S320, the control unit 212 receives a rec view image through a communication path for rec view transfer. Then, the control unit 212 causes the display unit 202 to display a rec view based on the rec view image.

In step S321, the control unit 212 determines whether a user performs a file transfer operation. For example, it is determined that a user performs a file transfer operation when he or she performs a given-button operation or a given touch operation. When it is determined in step S321 that a user performs a file transfer operation, the process shifts to step S322. When it is determined in step S321 that a user does not perform a file transfer operation, the process shifts to step S331.

In step S322, the control unit 212 determines whether a connection status of a communication path varies. When it is determined in step S322 that a connection status of a communication path varies, the process shifts to step S323. When it is determined in step S322 that a connection status of a communication path does not vary, the process shifts to step S325.

In step S323, the control unit 212 allocates the communication functions to each of the communication paths according to the settings of the priority database 2101.

In step S324, the control unit 212 sends the share command to the communication device 100 using a communication path for command communications. After that, the process shifts to step S327. Thus, the contents of the change in allocation of communication functions, which is made in the communication device 200, are shared with the communication device 100, too. As described above, the variation in the status of a communication path need not always be determined with this timing. Since this description is given by taking a camera as an example, the file transfer is emphasized. When a resultant image of, e.g. observation and inspection in a place where communications are difficult is transmitted, a rapid file transfer is often required. If these measures are taken, a user value can be increased as a more useful examination and surveillance camera. Needless to say, the file transfer may include not only image files of still and moving images but also audio files and text files in which examination results are converted into characters.

In step S325, the control unit 212 determines whether priority is given to a file transfer. The case where priority is given to a file transfer during the fulfillment of a camera function is, for example, a case where a high-quality image file should be transferred during the display of a live view and a case where a high-quality live view image should be displayed during the manual focus. When it is determined in step S325 that priority is given to a file transfer, the process shifts to step S326. When it is determined in step S325 that priority is not given to a file transfer, the process shifts to step S327. The functions to be controlled viewing a high resolution image, such as exposure and angle of view as well as the manual focus, correspond to this process.

In step S326, the control unit performs a file transfer priority process. After that, the process shifts to step S327. The file transfer priority process is, for example, a process of allocating a file transfer function to a plurality of communication paths, as shown in FIG. 2D. In addition, not only a process of reducing the size of image data transferred in other communications such as a live view transfer and raising its compression rate, but also a process of decreasing a frame rate of the transfer can be considered.

In step S327, the control unit 212 sends a file transfer command to the communication device 100 using a communication path for command communications.

In step S328, the control unit 212 determines whether it receives a share command from the communication device 100. When it is determined in step S328 that the control unit receives the share command from the communication device 100, the process shifts to step S329. When it is determined in step S328 that the control unit does not receive the share command from the communication device 200, the process shifts to step S330.

In step S329, the control unit 212 changes allocation of the communication paths in response to the share command. In step S330, the control unit 212 receives an image file through a communication path for file transfer. Then, the control unit 212 records the received image file on the recording unit 210. After that, the process shifts to step S331. These ideas correspond to the content that negotiations as to whether a communication method is set for each function between devices or how failsafe is set are made in advance. As described above, therefore, it does not matter which device is designated by which device. An example where a device having functions that are actually controlled makes a request that conforms to each of the functions, is described; however, there is a case where the functions of the device are grasped by another communication device. A device whose computing speed is high may determine a communication status and the capability of the other device to designate a share command. At this time, it can share the functions with the other device in cooperation with a network.

In step S331, the control unit 212 determines whether a camera stop instruction is provided. For example, it is determined that a camera stop instruction is provided when a given button is operated or a touch operation is performed. When it is determined in step S331 that a camera stop instruction is not provided, the process shifts to step S304. When it is determined in step S331 that a camera stop instruction is provided, the process shown in FIGS. 6A and 6B is completed.

Figure 7B:
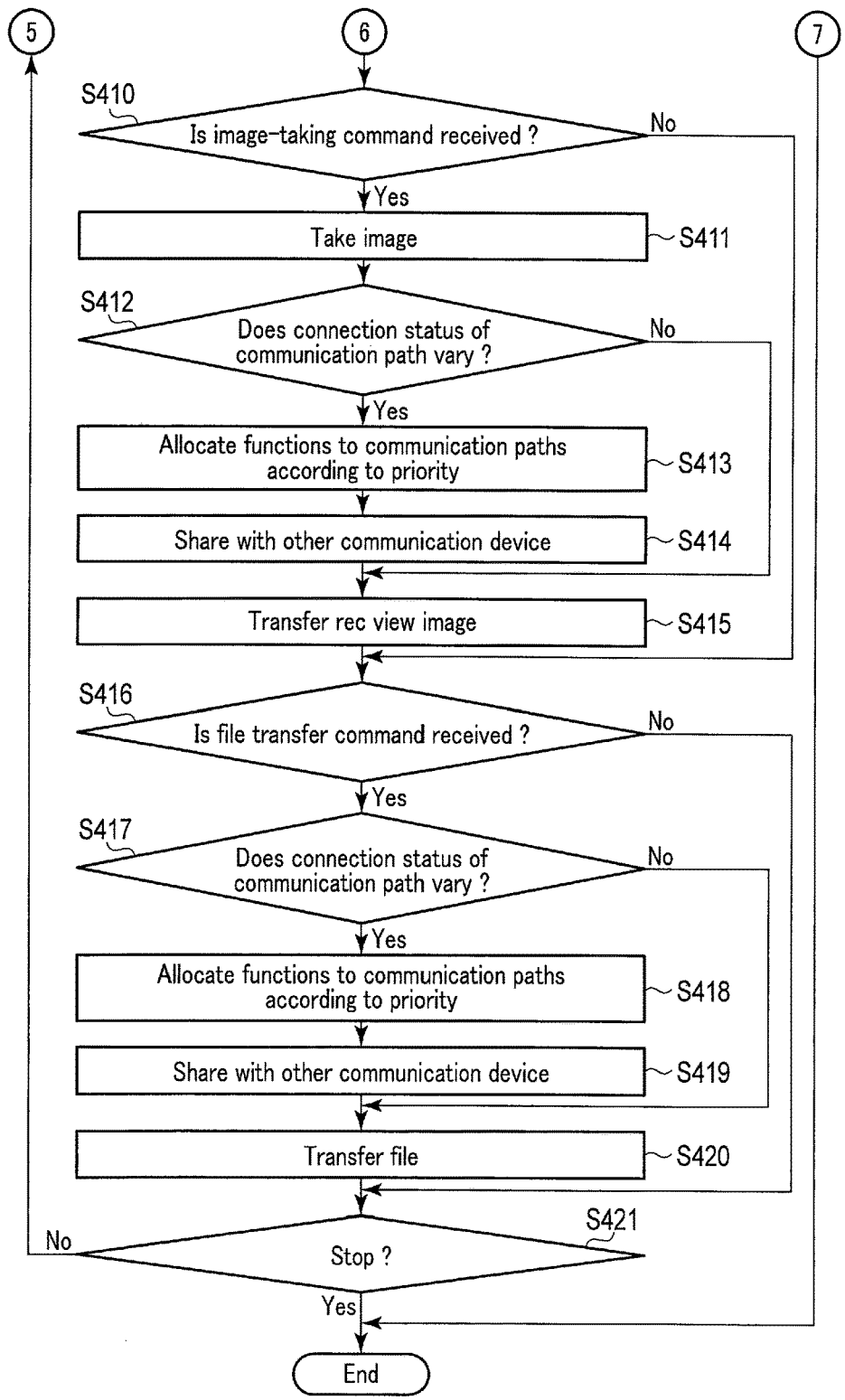
FIG. 7B is a second flowchart showing the operation of the camera function as a specific example of the operation of the communication device 100.

FIGS. 7A and 7B are flowcharts showing an operation of a camera function as a specific example of an operation of the communication device 100 in the communication system of the present embodiment. A general camera with a communication function can be used. The process shown in FIGS. 7A and 7B is controlled by the control unit 108.

In step S401, the control unit 212 determines whether a camera activation instruction is provided. For example, an activation instruction to operate a switch is provided. When it is determined that a camera activation instruction is provided in the communication device 200, it is determined that the camera activation instruction is provided in the communication device 100, too. When it is determined in step S401 that a camera activation instruction is not provided, the process shown in FIGS. 7A and 7B is completed. When it is determined in step S401 that a camera activation instruction is provided, the process shifts to step S402. The camera is generally used for observation and image taking, and the communication device 200 is, for example, a personal digital assistant and in most cases it is always turned on. This step is therefore added as the communication device 100 receiving a signal. Of course, there are cases where the communication devices are turned on at the same time and the camera is activated by operating the communication device 200 to the contrary. The application to these cases can be achieved by, for example, varying the direction of a communication request.

In step S402, the control unit 108 changes the settings of the priority database 1061 in response to a share command transmitted from the communication device 200 in accordance with the process in step S305.

In step S403, the control unit 108 determines whether a connection status of a communication path varies. When it is determined in step S403 that a connection status of a communication path varies, the process shifts to step S404. When it is determined in step S403 that a connection status of a communication path does not vary, the process shifts to step S406.

In step S404, the control unit 108 allocates the communication functions to each of the communication paths according to the settings of the priority database 1061. In step S405, the control unit 108 sends the share command to the communication device 200 using a communication path for command communications. Thus, the contents of the change in allocation of communication functions, which is made in the communication device 100, are shared with the communication device 200, too. It is repeatedly described that the ideas correspond to the content that negotiations as to whether a communication method is set for each function between devices or how failsafe is set are made in advance. As described above, therefore, it does not matter which device is designated by which device. This is described by the transmission from the communication device 100, assuming, for example, a case where the determination is made according to the situation such as a result of imaging at the time of a live view. In other words, an example where a device having functions that are actually controlled and can determine a situation at the time of image taking makes a request that conforms to each of the functions, is described; however, there is a case where the functions of the device are grasped by another communication device. A device whose computing speed is high may determine a communication status and the capability of the other device to designate a share command. At this time, it can share the functions with the other device in cooperation with a network. Furthermore, the setting can be made for each function and for each situation, and the timing and communication direction for the negotiation communications can be varied according to the situation.

In step S406, the control unit 108 sends a live view image to the communication device 200 using a communication path for live view transfer. When a live view image is sent using a low-priority communication path, a process of reducing the size, raising the compression rate and decreasing the frame rate of the transfer can also be used. In step S407, the control unit 108 sends a live view backup image to the communication device 200 using a communication path for live view backup. Moreover, when a live view backup image is sent using a low-priority communication path, a process of reducing the size, raising the compression rate and decreasing the frame rate of the transfer can also be used.

In step S408, the control unit 108 determines whether it receives the share command from the communication device 200. When it is determined in step S408 that the control unit receives the share command from the communication device 200, the process shifts to step S409. When it is determined in step S408 that the control unit does not receive the share command from the communication device 200, the process shifts to step S410.

In step S409, the control unit 108 changes allocation of each of the communication paths in response to the share command. Thus, the contents of the change in allocation of communication functions, which is made in the communication device 200, are shared with the communication device 100, too.

In step S410, the control unit 108 determines whether it receives an image-taking command. When it is determined in step S410 that the control unit receives the image-taking command, the process shifts to step S411. When it is determined in step S410 that the control unit does not receive the image-taking command, the process shifts to step S416.

In step S411, the control unit 108 controls the imaging unit 102 to perform an image-taking operation. Then, the control unit 108 processes image data acquired by the image-taking operation and records an image file obtained by the image processing on the recording unit 106.

In step S412, the control unit 108 determines whether a connection status of a communication path varies. When it is determined in step S412 that a connection status of a communication path varies, the process shifts to step S413. When it is determined in step S412 that a connection status of a communication path does not vary, the process shifts to step S416.

In step S413, the control unit 108 allocates the communication functions to each of the communication paths according to the settings of the priority database 1061. In step S414, the control unit 108 sends the share command to the communication device 200 using a communication path for command communications. Thus, the communication device 200 is also notified of the contents of the change made in the communication device 100. These ideas correspond to the content that negotiations as to whether a communication method is set for each function between devices or how failsafe is set are made in advance, and it has been described above that it does not matter which device is designated by which device. This is described by taking an example where a device having functions to be controlled makes a request that conforms to the situation when controlled; however, there is a case where the other communication device grasps what situation corresponds to the function. The process is not limited to this. A device whose computing speed is high may assume and determine a communication status and the capability of the other device to designate a share command. At this time, it can share the functions with the other device in cooperation with a network.

In step S415, the control unit 108 sends a rec view image using a communication path for rec view transfer.

In step S416, the control unit 108 determines whether it receives a file transfer command. When it is determined in step S416 that the control unit receives the file transfer command, the process shifts to step S417. When it is determined in step S416 that the control unit does not receive the file transfer command, the process shifts to step S421.

In step S417, the control unit 108 determines whether a connection status of a communication path varies. When it is determined in step S418 that a connection status of a communication path varies, the process shifts to step S418. When it is determined in step S418 that a connection status of a communication path does not vary, the process shifts to step S420.

In step S418, the control unit 108 allocates the communication functions to each of the communication paths according to the settings of the priority database 1061.

In step S419, the control unit 108 sends the share command to the communication device 200 using a communication path for command communications. The content of the change in allocation of the communication functions, which is made in the communication device 100, is shared with the communication device 200, too. These ideas correspond to the content that negotiations as to whether a communication method is set for each function between devices or how failsafe is set are made in advance, and it has been described above that it does not matter which device is designated by which device. This is described by taking an example where a device actually having a transmission function makes a request that conforms to the transmission situation and the optimum communication function corresponding to data; however, there is a case where the other communication device grasps what the function is and what the situation is. A device whose computing speed is high may determine a communication status and the capability of the other device to designate a share command. At this time, it can share the functions with the other device in cooperation with a network.

In step S420, the control unit 108 sends the image file designated by the file transfer command using a communication path for command communications.

In step S421, the control unit 108 determines whether a camera stop instruction is provided. For example, when it is determined that a camera stop instruction is provided in the communication device 200, it is determined that a camera stop instruction is provided in the communication device 100, too. When it is determined in step S421 that a camera stop instruction is not provided, the process returns to step S402. When it is determined in step S421 that a camera stop instruction is provided, the process shown in FIGS. 7A and 7B is completed.

As described above, according to the present embodiment, the communication system configured by communication devices including communication units corresponding to a plurality of communication paths allows different communication functions to be allocated to each of the communication units. It is thus possible to perform communications corresponding to the purpose of reducing communication load in a specific communication function, for example.

According to the present embodiment, furthermore, it is displayed which communication path is used for the current communication and what communication function is allocated to each of the communication paths. Thus, user's convenience is improved.

According to the present embodiment, furthermore, when the existent communication path is disconnected or a new communication path is connected, the allocation of the communication functions is changed in accordance with the contents of the priority database. Thus, communications can be restarted quickly when a communication path is suddenly disconnected. Moreover, when a communication path whose priority is higher than that of the existent communication path is connected, the communication path can be used to perform high-quality communications.

According to the present embodiment, furthermore, a live view backup image is transferred using a communication path other than a communication path for live view transfer. Thus, a live view can be displayed without interruption.

The status of communications to be changed during the communications includes not only the foregoing status but also the statuses in which the camera performs continuous shooting, the file transfer has priority over a live view, the power becomes short, the Wi-Fi is turned off to select Bluetooth communications of smaller power or another power supply, and the like. Furthermore, there is a case where the camera (communication device 100) determines that there is not a time to perform communications because the processing power of the camera reaches its limit and, in this case, the camera should gain access to the communication device 200. Moreover, as a case where the personal digital assistant (communication device 200) sends a share command to the camera, the following statuses are considered: a file transfer is necessary but a high-definition through image is unnecessary because the display of the personal digital assistant is rendered in power saving state, and an image-taking application transitions to the background when an image is transmitted and received through the network during the image taking. In this case, it is better to gain access to the communication device 100 from the communication device 200. In accordance with the use scene and user's desired operations as described, actually, a status in which a device requiring communications is selected, should be assumed as appropriate, which is covered by the present invention. In other words, the operation is performed while changing a connection destination of communication in a situation where the camera is connected to take an image using or not using an external service network when an external service such as an SNS is used. Therefore, before a connection is broken, the next connection can be designated and an agreement for reconnection can be designated by the preceding communication.

A modification to the present embodiment will be described below.

Modification 1

In the foregoing embodiment, the number of communication paths is three. The technology of the present embodiment can be applied even though the number of communication paths is two or four or more. In the foregoing embodiment, furthermore, the wire and wireless communication paths are mixed. The technology of the present embodiment can be applied even though the communication paths are wired only or wireless only. In addition, if the number of communication paths is two or more, it does not matter that the types thereof are the same.

Figure 8A:
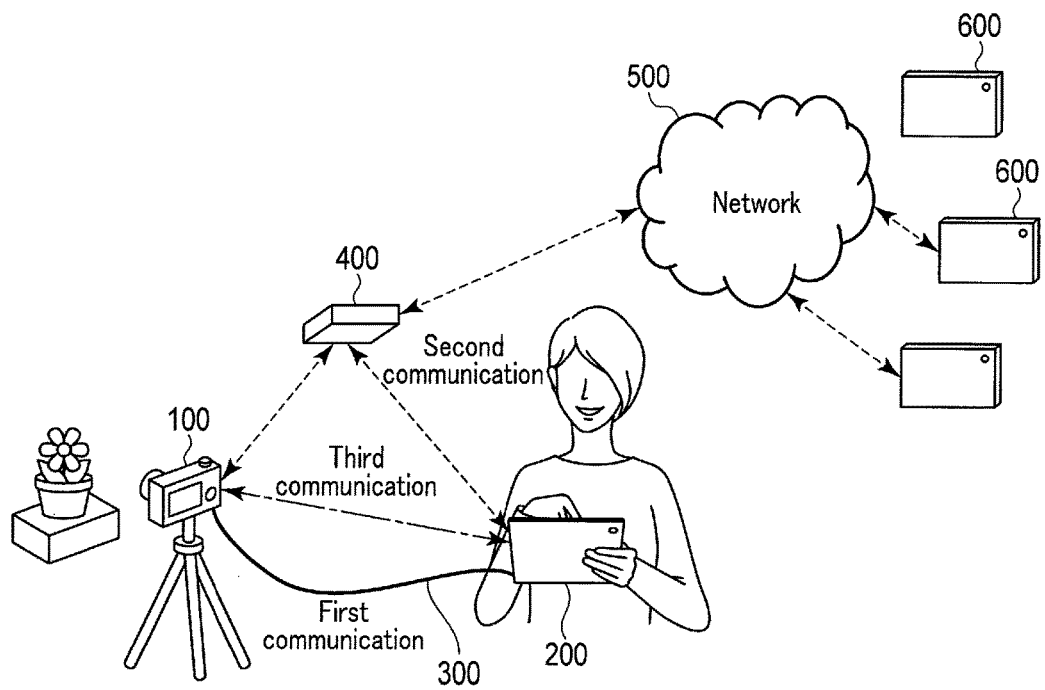
FIG. 8A is an illustration showing a modification in which a second communication unit does not perform direct communications.

The foregoing embodiment is directed to an application example of direct communications between the communication devices 100 and 200. The communications between the communication devices 100 and 200 can be carried out via an access point. An example of application to this communication system is shown in FIG. 8A. In the example of FIG. 8A, the second communication unit performs communications by means of Wi-Fi communications (infrastructure mode) via an access point 400. In the example of FIG. 8A, furthermore, the communication devices 100 and 200 are so configured that they can freely be connected to a network 500 through the access point 400. Moreover, the communication devices 100 and 200 are so configured that they can freely be connected to another communication device (imaging device) 600 through the network 500. When no communications can be performed between the devices, it is effective to switch the devices to communications performed through a network and a base station (or satellite), or to use a communication path linked with a plurality of communication devices because the constraints of, e.g. distance and interference relatively decrease.

Figure 8B:
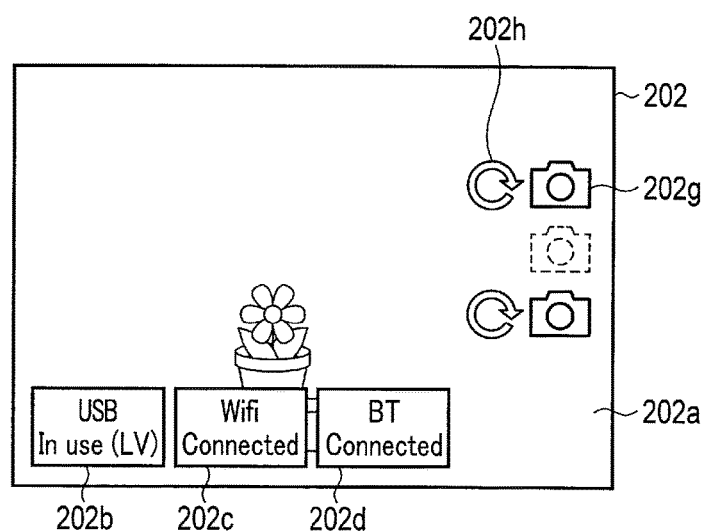
FIG. 8B is an illustration showing a modification in which the second communication unit does not perform direct communications.

In the above case, an icon 202g indicating a status of a communication path with the communication device 600 can be displayed as shown in FIG. 8B. The icon 202g is turned on while a communication path is being connected and it is turned off while a communication path is being disconnected.

Like the communication device 100, the communication device 600 can be so configured that its operation is controlled by the communication device 200. When the operation of the communication device 600 is under the control of the communication device 200, the icon 202g indicating a message to that effect can be displayed.

Modification 2

In the foregoing examples of FIGS. 6A and 6B and FIGS. 7A and 7B, a communication device that starts communications determines a connection status of a communication path. However, one of the communication devices has only to determine a connection status of a communication path. Furthermore, an alarm can be given when communications are carried out through a communication path that differs from the contents of the priority database.

Other Modifications

It is expected that the technology of the present embodiment will be applied to the fields of industry, medicine and the like. The technology of the present embodiment is applied to a communication system including a plurality of communication devices capable of performing communications through a plurality of communication paths. Therefore, the communication device 100 need not be an imaging device such as a generally-used camera but may be a camera configured to detect a specific wavelength, such as an infrared camera or an inspection device using sound, ultrasound, and radio wave such as microwave. It can also be applied to X-ray inspection, a radiation measurement device and the like. The communication device 200 need not be a smartphone. In this respect, it is expected that the technology of the present embodiment will be applied to various fields.

The processes of the foregoing embodiment can be stored as programs that can be executed by, e.g. a CPU as a computer. They can also be stored in a storage medium of an external storage device such as a memory card, a magnetic disk, an optical disk and a semiconductor memory, and distributed. Then, for example, the CPU reads in the programs stored in the storage medium of the external storage device, and the read programs control the operation, thereby performing the foregoing processes.

What is claimed is:
1. A communication device comprising:
 a communication circuit which performs communications with another communication device using a plurality of communication paths;

a communication function allocation circuit which allocates communication functions to each of the communication paths in the communication circuit;

a communication status determination circuit which determines a communication status for each of the communication paths;

a communication control circuit which controls communications for each of the communication paths in accordance with allocation by the communication function allocation circuit and a determination result of the communication status determination circuit; and a priority database which stores a priority of each communication status of each of the communication paths, wherein the communication control circuit performs the communications using a highest-priority communication path according to current communication statuses of connected communication paths to which the communication functions are allocated, and wherein the priority database stores a priority for each of a plurality of different types of transfers, for each of the communication paths.

2. The communication device according to claim 1, wherein the communication control circuit performs the communications using a highest-priority communication path of currently-connected communication paths when at least one of the communication paths is broken.

3. The communication device according to claim 1, wherein the communication control circuit performs the communications using a communication path that is linked with a plurality of communication devices.

4. The communication device according to claim 1, wherein when one of the communication paths is connected, the communication control circuit tries to activate other remaining communication paths.

5. The communication device according to claim 1 wherein the plurality of different types of transfers include a Live View transfer and a file transfer.

6. A communication system configured to perform communications between a first communication device and a second communication device, the second communication device comprising:

a communication circuit which performs communications with the first communication device using a plurality of communication paths;

a communication function allocation circuit which allocates communication functions to each of the communication paths in the communication circuit;

a communication status determination circuit which determines a communication status for each of the communication paths; and a communication control circuit which controls communications for each of the communication paths in accordance with allocation by the communication function allocation circuit and a determination result of the communication status determination circuit; and a priority database which stores a priority of each communication status of each of the communication paths, wherein the communication control circuit performs the communications using a highest-priority communication path according to current communication statuses of connected communication paths to which the communication functions are allocated, and wherein the priority database stores a priority for each of a plurality of different types of transfers, for each of the communication paths.

7. The communication system of claim 6, further comprising:

a display control circuit which causes a display to display the communication functions such that the communication functions are visually recognized.

8. The communication system according to claim 6 wherein the plurality of different types of transfers include a Live View transfer and a file transfer.

9. A method for performing communications by a first communication device and a second communication device using a plurality of communication paths, the method comprising:

allocating communication functions to each of the communication paths;

determining a communication status for each of the communication paths; and controlling communications for each of the communication paths in accordance with the allocating and a result of the determining; and storing, in a priority database, a priority of each communication status of each of the communication paths, wherein communications are performed using a highest-priority communication path according to current communication statuses of connected communication paths to which the communication functions are allocated, and wherein the priority database stores a priority for each of a plurality of different types of transfers, for each of the communication paths.

10. The method of claim 9 further comprising:

causing a display to display the communication functions such that the communication functions are visually recognized.

11. A communication device comprising:

a communication circuit which performs communications with another communication device using a plurality of communication paths;

a communication function allocation circuit which allocates communication functions to each of the communication paths in the communication circuit;

a display control circuit which causes a display to display a communication status of the communication circuit such that the communication status is visually recognized;

a communication status determination circuit which determines a communication status for each of the communication paths;

a communication control circuit which controls communications for each of the communication paths in accordance with allocation by the communication function allocation circuit and a determination result of the communication status determination circuit; and a priority database which stores a priority of each communication status of each of the communication paths, wherein:

priority is set to each of the plurality of communication paths based on the priorities stored in the priority database;

the communication control circuit performs the communications using a highest-priority communication path of connected communication paths to which the communication functions are allocated; and the priority database stores a priority for each of a plurality of different types of transfers, for each of the communication paths.

12. The communication device according to claim 11, wherein the display control circuit causes the display to display a communication path used in current communication, a communication path currently connected, and a communication path currently disconnected, as a communication status of the communication circuit.

13. The communication device according to claim 11, wherein the communication function allocation circuit allocates the communication functions in accordance with a user's operation or automatically.

14. The communication device according to claim 11, wherein the communication control circuit performs the communications using a communication path that is linked with a plurality of communication devices.

* * * * *